(12) United States Patent
Kim et al.

(10) Patent No.: US 8,457,111 B2
(45) Date of Patent: Jun. 4, 2013

(54) VOICE COMMUNICATION METHOD AND SYSTEM IN UBIQUITOUS ROBOTIC COMPANION ENVIRONMENT

(75) Inventors: Joon Koo Kim, Seoul (KR); Kwang Choon Kim, Suwon-si (KR); Byung Kwon Choi, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1169 days.

(21) Appl. No.: 12/266,720

(22) Filed: Nov. 7, 2008

(65) Prior Publication Data

US 2009/0122790 A1    May 14, 2009

(30) Foreign Application Priority Data

Nov. 8, 2007    (KR) ........................ 10-2007-0113935

(51) Int. Cl.
*H04L 12/66* (2006.01)

(52) U.S. Cl.
USPC ......................................................... 370/352

(58) Field of Classification Search
None
See application file for complete search history.

(56) References Cited

U.S. PATENT DOCUMENTS

| | | | |
|---|---|---|---|
| 2006/0149824 A1* | 7/2006 | Park et al. | 709/206 |
| 2006/0161303 A1* | 7/2006 | Wang et al. | 700/259 |
| 2007/0112463 A1* | 5/2007 | Roh et al. | 700/245 |
| 2007/0199108 A1* | 8/2007 | Angle et al. | 901/17 |
| 2010/0076600 A1* | 3/2010 | Cross et al. | 700/259 |

* cited by examiner

*Primary Examiner* — Chirag Shah
*Assistant Examiner* — Minh-Trang Nguyen
(74) *Attorney, Agent, or Firm* — Cha & Reiter, LLC

(57) ABSTRACT

A voice communication method and system that enables establishing a voice communication in a URC environment is provided. The voice communication method and system of the present invention allow establishing a voice communication channel between terminals (private IP address to private IP address, public IP address to public IP address, and private IP address to public IP address) in a URC environment. Particularly, the voice communication system of the present invention is implemented with a call server acting as a STUN server for supporting voice communication between two terminals of which one is assigned private IP address and controlling the communication session in the URC environment.

12 Claims, 3 Drawing Sheets

VOICE COMMUNICATION METHOD AND SYSTEM IN UBIQUITOUS ROBOTIC COMPANION ENVIRONMENT

CLAIM OF PRIORITY

This application claims the benefit of the earlier filing data, pursuant to 35 USC 119, to that patent an application entitled "VOICE COMMUNICATION METHOD AND SYSTEM IN UBIQUITOUS ROBOTIC COMPANION ENVIRONMENT," filed in the Korean Intellectual Property Office on Nov. 8, 2007 and assigned Serial No. 2007-0113935, the contents of which are incorporated herein by reference.

BACKGROUND OF THE INVENTION

1. Field of the Invention

The present invention relates voice communication and, in particular, to a voice communication method and system in a Ubiquitous Robotic Companion (URC) environment that is capable of establishing a voice communication channel between terminals by using User Datagram Protocol (UDP) and Network Address Translator (NAT) for converting a private Internet Protocol (IP) address to a Public IP address.

2. Description of the Related Art

Ubiquitous Robotic Companion (URC) is a Ubiquitous Network-based Robot system that aims for a robot friend to service people anywhere and anytime through the network. This goal can be achieved by distributing most of robot functions to URC servers and providing intelligence for robots with low prices such that an individual can command a robot and enjoy various URC services.

In the meantime, IP telephony is a voice communication service provided through the Internet. Typically, IP telephony is implemented with the User Datagram Protocol (UDP) to secure real time voice transmission. In order to establish a UDP transport channel, however, both the calling and called terminals are in a public domain in which the terminals are assigned public IP addresses. In a case that the called terminal is located in a private domain, the calling party may know only the public IP address of a Network Address Translator (NAT) enabled router but not the private IP address of the called terminal, resulting in communication channel establishment failure.

In order to solve this problem, a port forwarding technique, in which the ports of the router are forcibly assigned respective private IP addresses, has been used. The port forwarding technique disables automatic port assignment function of the router such that the terminals located in the domain under the control of the same router can communicate with each other with the knowledge of IP addresses matched to the port numbers of the router.

However, the port forwarding technique has a drawback in that the ports of the router (e.g. line sharer and access point (AP)) are assigned with fixed IP addresses, resulting in inefficiency of resource management. Also, the port forwarding technique requires that the terminals are assigned fixed private IP addresses because the use of flexible IP addresses requires frequent update of a mapping table whenever the IP address assigned to each terminal is changed. Accordingly, there has been a need for developing an improved IP telephony method that is capable of establishing a voice channel between terminals assigned private flexible IP addresses.

SUMMARY OF THE INVENTION

As described above, it is inefficient and restrictive to use the port forwarding technique for IP-based voice communication in the URC environment in view of resource management.

The present invention provides a voice communication method and system that enables establishing a voice communication channel between terminals assigned either public or private IP addresses in a URC environment.

In accordance with an exemplary embodiment of the present invention, a call server is in a voice communication system, with the voice communication system composed of at least one remote terminal and at least one robot terminal for managing voice communication over a network utilizing a network address translator, and the call server comprises a processor in communication with a memory, the memory including code, which when accessed by said processor instructs said processor to generate a first list to register each of said remote terminals and robot terminals, said first list including a terminal identifier (ID), a terminal IP address, a terminal type, and a terminal port number of the at least one robot terminal and the at least one remote terminal, to generate a second list to register each of said remote terminals and robot terminals, said second list including a terminal identifier (ID), a terminal IP address, a terminal type, a terminal port number, and a network address translator (NAT) of at least one of the robot terminal and the remote terminal, and to establish a voice communication channel between a select one of the at least one remote terminal and a select one of the at least one robot terminal using the second list.

In accordance with another exemplary embodiment of the present invention, a call server in a ubiquitous robotic companion (URC) voice communication system comprises a processor in communication with a memory, the processor accessing code in said memory for registering a robot terminal and a remote terminal to a URC server, receiving a request from the remote terminal to call the robot terminal, responsive to an acceptance of said call by the robot terminal, and for transmitting terminal information regarding the robot terminal to the remote terminal and transmitting terminal information regarding the remote terminal to the robot terminal, and establishing a voice communication channel between the robot terminal and remote terminal on the basis of the terminal information.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention.

In order to enable a clear and consistent understanding of detailed description and the claims, basic information on the following terms are used. Unless otherwise noted, terms are to be understood according to conventional usage by those skilled in the relevant art. While the present invention is able to be embodied in many different forms, specific embodiments thereof are shown in drawings and described herein in detail, with the understanding that the present disclosure is to be considered as an exemplification of the principles of the invention and is not intended to limit the invention to the specific embodiments illustrated.

For example, the voice communication method and system of the present invention is described with a term "remote terminal" which represents Personal Computer (PC), laptop computer, mobile communication device, cellular phone, Personal Digital Assistant (PDA), Smartphone, Wireless Broadband (WiBro) terminal, $3^{rd}$ generation (3D) communication (i.e., International Mobile Telecommunication 2000; IMT-2000) terminal including Wideband Code Division Multiple Access (WCDMA) and Universal Mobile Telecommunication System (UMTS) terminals, High Speed Downlink Packet Access (HSDPA) terminal, Digital Broadcast Receiver, and their equivalents.

Although the voice communication method between a robot terminal and a remote terminal is described in the following exemplary embodiments, the present invention is not limited thereto. For example, all the terminals having communication functionalities can communicate among each other through voice communication channels established according to the voice communication method and system of the present invention in the URC environment.

In the following, Simple Traversal of UDP through NAT (STUN) protocol is used to find out the type of the Network Address Translator (NAT) and port numbers mapped to private IP addresses.

Figure 1:
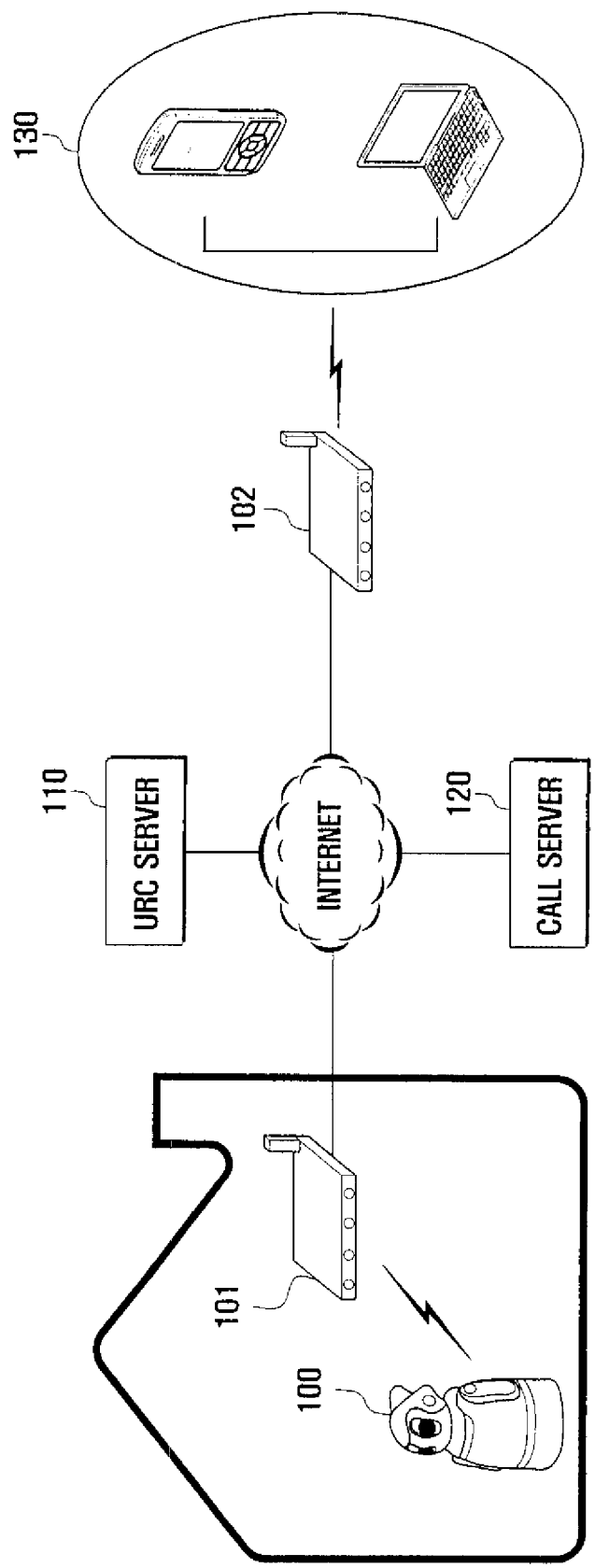
FIG. 1 is a schematic diagram illustrating a voice communication system in a URC environment according to an exemplary embodiment of the present invention.

FIG. 1 is a schematic diagram illustrating a voice communication system in a URC environment according to an exemplary embodiment of the present invention.

Referring to FIG. 1, the voice communication system includes a URC server 110, a call server 120, a remote terminal 130, a robot terminal 100, a first AP 101, and a second AP 102. In more detail, the robot terminal 100 is equipped with a wireless local area network (WLAN) card so as to connect to the URC server 110 and call server 120 via the first AP 101. The URC server 110 and the call server 120 also can connect to the remote terminal 130 via the second AP 102. The remote terminal 130 and the robot terminal 100 establish a voice communication channel and communicate with each other through the voice channel. Each of the robot terminal 100 and the remote terminal 130 is equipped with a Service Agent Manager (SAM) to communicate with the URC server 110 and a call client to communicate with the call server 120. The SAM enables the robot terminal 100 and the remote terminal 130 to communicate with the URC server using a PLANET protocol as a URC standard protocol. In the meantime, the robot terminal 100 or the remote terminal 130 can communicate with each other through a UDP channel established between their call clients.

The remote terminal 130 can be a PDA or a PC having a communication function so as to connect to the URC server 110 and transmits a command to the robot terminal 100. The remote terminal 130 can be assigned a public IP address or a private IP address. In the case of a private network domain, the NAT is required for translating the private IP address to a public IP address. This is because the calling terminal should know the public IP address of the called terminal as well as the port number and type of the NAT.

The first AP 101 acts as a modem for allowing the robot terminal 100 to connect to the Internet and thus it can be provided with a NAT function for supporting the private network domain.

Also, the second AP 102 acts as a modem for allowing the remote terminal 130 connect to the Internet and providing the NAT function for supporting the private network domain. In a case that the remote terminal 130 is a WiBro terminal or other cellular communication device that can access the Internet through a base station of a cellular network, there is no need to access the second AP 102.

The URC server 110 is responsible for managing and controlling starts and ends of all the services provided in the URC environment and monitoring the status of the terminals. In this embodiment, the URC server 110 controls the overall operations related to the voice communication system. In more detail, the robot terminal 100 and the remote terminal 130 boot up, they request registration of their information to the URC server 110. At this time, the URC server 110 generates a first list of the terminals with their identifiers (IDs), terminal types, IP addresses, and port numbers assigned in their respective network domain. The first list can be created in the form of table 1 as following.

TABLE 1

| ID | TYPE | IP address<br>IP address of AP | PORT<br>PORT |
|---|---|---|---|
| Alpha | PC | 192.168.10.1 | 4661 |
|  |  | 124.61.124.86 | 500 |
| Beta | ROBOT | 192.168.10.5 | 4242 |
|  |  | 124.61.124.1 | 512 |
| Gamma | HANDPHONE | 211.211.100.32 | 5000 |
|  |  | 211.211.100.32 | 5000 |

As shown in table 1, the first list provides information on the terminals and APs to which the terminals are connected, such as terminal IDs, IP addresses of the terminals and AP, terminal type, and port numbers. If a call request is received with the terminal ID and type of the robot terminal 100 from the remote terminal 130, the URC server 110 checks the information of the robot terminal 100 registered to the first list and transmits a call request message to the robot terminal 100.

In order to help understand the first list, an example of a first list is depicted in the form of table 1 in this embodiment, although the present invention is not limited thereto. Actually, the first list can be implemented in various formats.

The call server 120 is responsible for providing the information on the public IP addresses of terminals, NAT type, and port mapping information assigned to the terminals, and controlling the voice communication session, in the network domain using the NAT. Also, the remote terminal 130 and the robot terminal 100 register information of terminal IDs, NAT type, IP addresses, and port numbers to the call server 120. The call server 120 can check whether each network domain uses NAT. In more detail, the call server 120 can recognize whether a network domain uses a NAT by comparing the IP address of a source from which a packet is transmitted and the IP address contained in the packet. If the IP address of the source transmitted the packet and the IP address contained in the packet is identical with each other, it is recognized that the terminal uses the public IP address. Otherwise, it is recognized that the terminal uses a private IP address. In the case that both the terminals use private IP addresses, the call server 120 transmits a STUN message to the first AP 101 to which the robot terminal 100 is connected and the second AP 102 to which the remote terminal 130 is connected, and receives information including the NAT type, IP address, and mapping information in response to the STUN message. At this time, the call server 120 generates a second list on the basis of the information received from the robot terminal 100 and the remote terminal 130 as shown in table 2.

TABLE 2

| ID | TYPE | IP address<br>IP address of AP | PORT<br>PORT | NAT |
|---|---|---|---|---|
| Alpha | PC | 192.168.10.1<br>124.61.124.86 | 4661<br>500 | Symmetric cone |
| Beta | ROBOT | 192.168.10.5<br>124.61.124.1 | 4242<br>512 | Symmetric cone |
| Gamma | HANDPHONE | 211.211.100.32<br>211.211.100.32 | 5000<br>5000 | X |

As shown in table 2, the second list provides information on the terminals and APs to which the terminals are connected. The information includes IDs, types, IP addresses, and port numbers of the terminals, and types of the NATs. The UDP channel can be established according to the type of NAT. In this embodiment, a hole punching method is used for establishing UDP connections between the terminals.

The robot terminal 100 is an intelligent robot providing services under the control of the URC server 110. Particularly, the robot terminal 100 provides the voice communication service with the remote terminal 130 in this embodiment.

Figure 2:
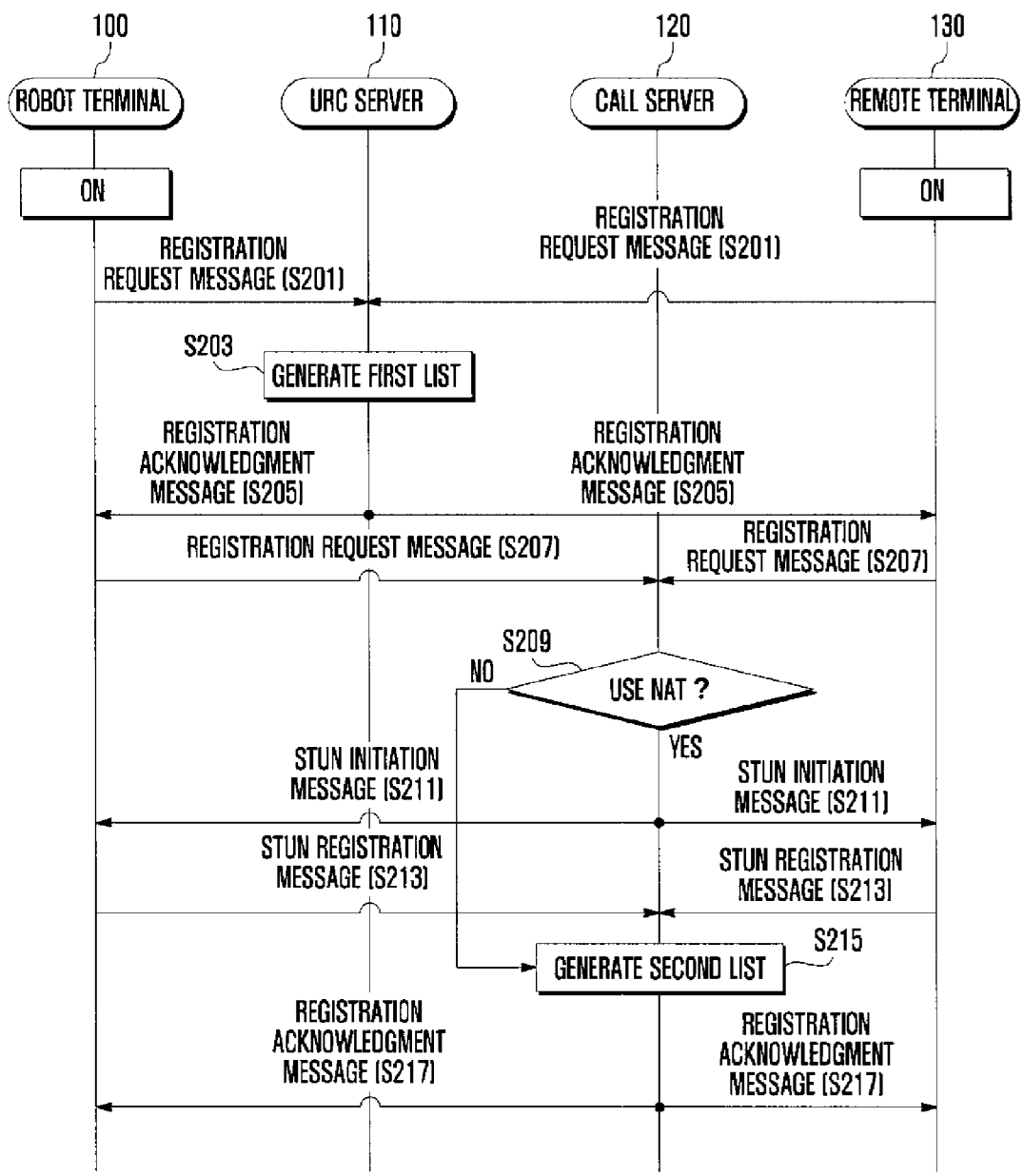
FIG. 2 is a message flowchart illustrating a device registration procedure of voice communication method according to an exemplary embodiment of the present invention.

FIG. 2 is a message flowchart illustrating a device registration procedure of voice communication method according to an exemplary embodiment of the present invention.

Referring to FIG. 2, once the robot terminal 100 and the remote terminal 130 are turned on, each terminal transmits a registration request message to the URC server (S201). The registration request message includes ID, type, IP address, and port number of the terminal. Upon receiving the registration request messages from the robot terminal 100 and the remote terminal 130, the URC server 100 generates the first list on the basis of the information contained in the registration request messages (S203). After generating the first list, the URC server 110 transmits a registration acknowledgement message to the robot terminal 100 and the remote terminal 130 (S205). Accordingly, the robot terminal 100 and the remote terminal 130 are registered to the URC server 110.

After the registration procedure is complete, each of the robot terminal 100 and the remote terminal 130 transmits the registration request message to the call server 120 (S207). Upon receiving the registration request messages from the robot terminal 100 and the remote terminal 130, the call server determines whether either the robot terminal 100 or the remote terminal 130 is connected to a NAT-enabled router (S209). A terminal is determined to be connected to a NAT-enabled router by comparing the internal IP address and the external IP address contained in the registration request message. If the internal and external IP addresses are identical with each other, it is determined that the terminal is connected to a router which does not use NAT. On the other hand, if the internal and external IP addresses are different from each other, it is determined that the terminal is connected to an NAT-enabled router.

If it is determined that either the robot terminal 100 or the remote terminal 130 is connected to a router which does not use an NAT, the call server 120 generates a second list (S215). On the other hand, if it is determined that both the robot and remote terminals 100 and 130 are connected to respective NAT-enabled router, the call server 120 transmits a STUN initiation message to the robot and remote terminals 100 and 130 to recognize the types of NATs (S211). The STUN initiation message is forwarded to both the first AP 101 associated with the robot terminal 100 and the second AP 102 associated with the remote terminal 130 for requesting information on the IP addresses and NAT types (e.g., Full Cone NAT, Restricted Cone NAT, Port Restricted Cone NAT, and Symmetric Cone NAT) of the APs 101 and 102, and port mapping information mapped to the internal IP addresses of the terminals. That is, the STUN initiation message is transmitted to the NAT equipments managing the robot terminal 100 and the remote terminal 130. Upon receiving the STUN initiation message, each of the NAT equipments (i.e., the first and second APs 101 and 102) transmits a STUN registration message containing its NAT type, IP address, and port mapping information to the call server 120 (S213). In this manner, the call server 120 gathers the information for establishing a UDP voice communication channel.

Next, the call server 120 generates the second list containing the information on the IP addresses, port numbers, IDs, types, and NAT types (S215). After generating the second list, the call server 120 transmits a registration acknowledgement message to the robot terminal 100 and the remote terminal 130 (S217).

Although it is depicted that the robot and remote terminals 100 and 130 are registered to the URC server 110 and the call server 120 in such an order, the present invention is not limited thereto. For example, the registration can be performed in an order of the call server 130 and the URC server 110 or simultaneously.

Now, a call connection procedure between two terminals registered to the URC and call server is described.

Figure 3:
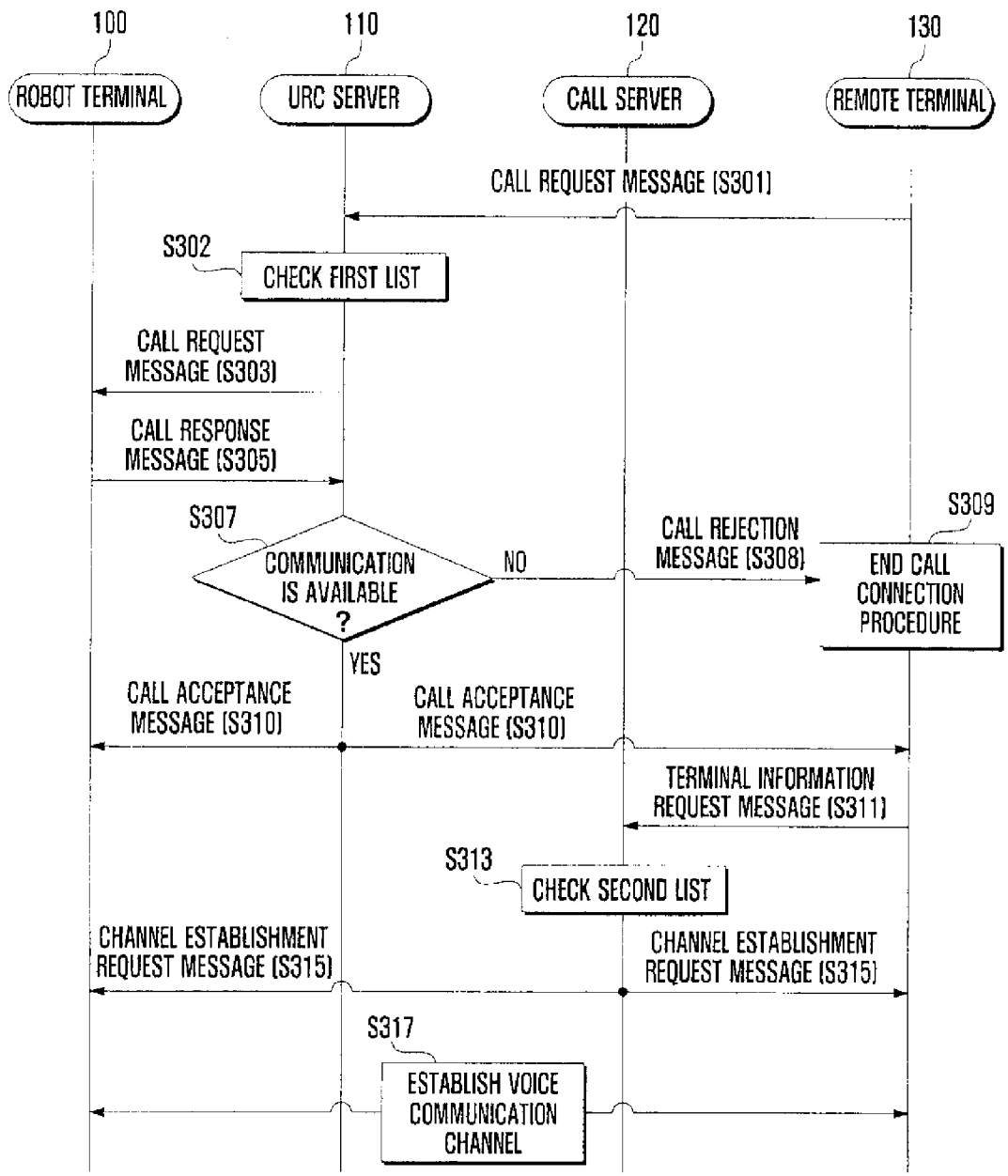
FIG. 3 is a message flowchart illustrating a call connection procedure of a voice communication method according to an exemplary embodiment of the present invention.

FIG. 3 is a message flowchart illustrating a call connection procedure of a voice communication method according to an exemplary embodiment of the present invention.

Referring to FIG. 3, the remote terminal 130 transmits a call request message to the URC server 110 for requesting a call to the robot terminal 100 (S301). Here, the call request message may contain the terminal ID and type of the robot terminal 100. When the call request message is received, the URC server 110 checks the IP address and port number of the robot terminal 100 from the first list (S302) and then transmits the call request message to the robot terminal 100 (S303). Upon receiving the call request message, the robot terminal 100 transmits a call response message indicating whether to receive or not to receive the URC server message (S305). When the call response message is received, the URC server 110 determines whether the robot terminal 100 is available on the basis of the call response message (S307). If it is determined that the robot terminal 100 is not available, the URC server 110 transmits a call rejection message to the remote terminal (S308). The call rejection message may contain an announcement message indicating that the line is busy or the user is unavailable. When the call rejection message is received, the remote terminal 130 ends the call connection procedure (S309).

If it is determined that the robot terminal 100 is available at step S307, the URC server 110 transmits a call acceptance message to the remote terminal 130 and call preparation message to the robot terminal 100 (S310). Upon receiving the call acceptance message, the remote terminal 130 transmits a terminal information request message containing the terminal ID and type of the robot terminal 100 to the call server 120 (S311). If the terminal information request message is received, the call server 120 checks the robot terminal 100 from the second list on the basis of the terminal ID and type and retrieves information (including the IP address and port number of the robot terminal, and a NAT type of the router associated with the robot terminal) required for establishing a voice channel to the robot terminal (S313). Next, the call server 120 transmits a channel establishment request message containing the terminal information on the robot terminal 100 to the remote terminal 130 and a channel establishment request message containing the terminal information on the remote terminal 130 to the robot terminal 100 (S315). Using the IP address and port number of the counterpart terminals, a voice communication channel between the robot and remote terminal 100 and 130 is established (S317). In the case that the robot and remote terminals 100 and 130 belong to the public networks that do not use NAT, the voice channel is established using well-known techniques as previously describe. However, if either the robot terminal 100 or the remote terminal 100 belongs to a private network using an NAT, a UDP channel is established between them. In this embodiment, the hole punching method is used for establishing the UDP channel and a communication is established using the previous method described.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. In addition, although a URC server and a call server are described respectively in this exemplary embodiment of the present invention, the URC server and call server may be implemented as one server. In other words, the URC server may include a function of call server, or the call server may include a function of URC server in this exemplary embodiment of the present invention.

As describe above, the voice communication method and system for a URC environment according to the present invention is advantageous in efficient resource management since the terminals assigned flexible IP addresses can establish a voice communication channel reliably.

Also, the voice communication method and system for a URC environment according to the present invention is advantageous because there is no need to update a mapping table even when an IP address assigned to a specific port changes.

What is claimed is:

1. A call server in a voice communication system composed of at least one remote terminal and at least one robot terminal for managing voice communication over a network utilizing a network address translator, the call server comprising:
   a processor in communication with a memory, the memory including code, which when accessed by said processor instructs said processor to:
      generate a first list to register each of said remote terminals and robot terminals, said first list including a terminal identifier (ID), a terminal IP address, a terminal type, and a terminal port number of the at least one robot terminal and the at least one remote terminal;
      determine, using the first list, whether a select one of the at least one remote terminal and a select one of the at least one robot terminal are connected to a device using a network address translator (NAT);
      in response to the determination using the first list, generate a second list to register each of said remote terminals and robot terminals, said second list including a terminal identifier (ID), a terminal IP address, a terminal type, a terminal port number, and a network address translator (NAT) of at least one of the robot terminal and the remote terminal; and
      establish a voice communication channel between the select one of the at least one remote terminal and the select one of the at least one robot terminal based on the first list and the second list.

2. The call server of claim 1, wherein in establishing said voice communication channel, parameters associated with said communication channel are determined from said first list when an IP address of each of a source terminal and a destination terminal are equal.

3. The call server of claim 2, wherein in establishing said voice communication channel, parameters associated with said communication channel are determined from said second list when the IP address of said source terminal and said destination terminal are not equal.

4. The call server of claim 1, the NAT is one among Full Cone NAT, Restricted Cone NAT, Port Restricted Cone NAT and Symmetric Cone NAT.

5. The call server of claim 1, the processor to establish a voice communication channel between a select one of the at least one remote terminal and a select one of the at least one robot terminal with a user datagram protocol (UDP).

6. The call server of claim 5, the UDP is used by a hole punching method for establishing UDP connections between the terminals.

7. The call server of claim 1, the NAT is required for translating the private IP address to a public IP address.

8. The call server of claim 1, wherein a Simple Traversal of UDP through NAT (STUN) protocol is used to determine a type of the Network Address Translator (NAT) and port numbers mapped to private IP addresses.

9. A call server in a ubiquitous robotic companion (URC) voice communication system, comprising:
   a processor in communication with a memory, the processor accessing code in said memory for:
      registering a robot terminal and a remote terminal to a URC server to generate and store, in the memory, registration data including connection parameters of the robot terminal and the remote terminal, wherein registering a robot terminal and a remote terminal comprises:
      generating a first list in the registration data, including, as the connection parameters, a terminal identifier (ID), terminal IP address, terminal type, and terminal port number of at least one of the robot terminal and the remote terminal;
      extracting a type and port mapping information of the NAT; and
      generating a second list in the registration data, including, as the connection parameters, a terminal identifier (ID), terminal IP address, terminal type, and terminal port number of at least one of the robot terminal and the remote terminal that does not use the NAT;

receiving a request from the remote terminal to call the robot terminal;

determining a connectivity status of the robot terminal and the remote terminal using the registration data, wherein determining a connectivity status comprises checking that at least one of the robot terminal and the remote terminal is associated with a network using a network address translator (NAT);

responsive to the connectivity status and an acceptance of said call by the robot terminal, transmitting terminal information regarding the robot terminal to the remote terminal and transmitting terminal information regarding the remote terminal to the robot terminal; and establishing a voice communication channel between the robot terminal and remote terminal on the basis of the terminal information.

10. The call server of claim 9, wherein establishing a voice communication channel is performed by a user datagram protocol-based hole punching technique.

11. A call server in a ubiquitous robotic companion (URC) voice communication system, comprising:

a processor in communication with a memory, the processor accessing code in said memory for:

registering a robot terminal and a remote terminal to a URC server to generate and store, in the memory, registration data including connection parameters of the robot terminal and the remote terminal, wherein registering a robot terminal and a remote terminal comprises:

generating a first list in the registration data, including, as the connection parameters, a terminal identifier (ID), terminal IP address, terminal type, and terminal port number of at least one of the robot terminal and the remote terminal;

extracting a type and port mapping information of the NAT; and generating a second list in the registration data, including, as the connection parameters, a terminal identifier (ID), terminal IP address, terminal type, port mapping information, and network address translator type of at least one of the robot terminal and the remote terminal using the NAT;

receiving a request from the remote terminal to call the robot terminal;

determining a connectivity status of the robot terminal and the remote terminal using the registration data, wherein determining a connectivity status comprises checking that at least one of the robot terminal and the remote terminal is associated with a network using a network address translator (NAT);

responsive to the connectivity status and an acceptance of said call by the robot terminal, transmitting terminal information regarding the robot terminal to the remote terminal and transmitting terminal information regarding the remote terminal to the robot terminal; and establishing a voice communication channel between the robot terminal and remote terminal on the basis of the terminal information.

12. The call server of claim 11, wherein establishing a voice communication channel is performed by a user datagram protocol-based hole punching technique.

* * * * *